United States Patent
Wang

(10) Patent No.: US 12,207,786 B2
(45) Date of Patent: Jan. 28, 2025

(54) MATERIAL DETERMINING DEVICE, MATERIAL DETERMINING METHOD, AUTONOMOUS CLEANING DEVICE

(71) Applicant: PixArt Imaging Inc., Hsin-Chu (TW)

(72) Inventor: Guo-Zhen Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 314 days.

(21) Appl. No.: 17/947,167

(22) Filed: Sep. 18, 2022

(65) Prior Publication Data

US 2023/0016001 A1  Jan. 19, 2023

Related U.S. Application Data

(63) Continuation-in-part of application No. 16/907,329, filed on Jun. 22, 2020, now Pat. No. 11,493,336.

(51) Int. Cl.
*A47L 9/28* (2006.01)
*G06T 7/49* (2017.01)

(52) U.S. Cl.
CPC .............. *A47L 9/2805* (2013.01); *G06T 7/49* (2017.01)

(58) Field of Classification Search
CPC ..... A47L 9/2805; A47L 2201/06; G06T 7/49; G06V 10/143; G06V 20/50; G06V 10/443; G01N 21/94
See application file for complete search history.

(56) References Cited

U.S. PATENT DOCUMENTS

| | | |
|---|---|---|
| 8,600,553 B2 | 12/2013 | Svendsen |
| 9,320,398 B2 | 4/2016 | Hussey |
| 11,510,539 B2 * | 11/2022 | Ng ........................ A47L 9/2852 |
| 2012/0095651 A1 | 4/2012 | Anderson |
| 2013/0258321 A1 | 10/2013 | Jurca |

(Continued)

FOREIGN PATENT DOCUMENTS

| | | | |
|---|---|---|---|
| CN | 101711353 A | | 5/2010 |
| CN | 103443612 A | | 12/2013 |

(Continued)

OTHER PUBLICATIONS

Mao Jin-feng et al., Research of Intelligent Cleanliness Assessment System of Air Duct Cleaning Robot, National Defense Engineering Institute, PLA University of Science and Technology, Building Energy & Environment vol. 34, No. 1, p. 37-41 ,Jan. 25, 2015.

(Continued)

*Primary Examiner* — Richard M Camby
(74) *Attorney, Agent, or Firm* — Winston Hsu

(57) ABSTRACT

A material determining device comprising a first image sensor, a second image sensor, and a light source is provided. The material determining method comprises: (a) sensing a first image by the first image sensor according to light from the light source; (b) sensing a second image by the second image sensor according to the light; and (c) determining whether material corresponding to material images in the first image and the second image is first type of material or second type of material, according to locations of the material images in the first image and the second image and according to shapes of the material images in the first image and the second image. By this way an electronic device using the material determining device can properly operate according to the type of material.

24 Claims, 10 Drawing Sheets

(56) References Cited

U.S. PATENT DOCUMENTS

| | | |
|---|---|---|
| 2014/0343846 A1 | 11/2014 | Goldman |
| 2016/0104044 A1 | 4/2016 | Noh |
| 2016/0370282 A1 | 12/2016 | Zhan |
| 2017/0332871 A1 | 11/2017 | Sung |
| 2017/0332872 A1 | 11/2017 | Jun |
| 2019/0274505 A1* | 9/2019 | Ng .................. G05D 1/02 |
| 2020/0079325 A1 | 3/2020 | Tilleman |
| 2020/0375426 A1 | 12/2020 | Wang |
| 2021/0016449 A1 | 1/2021 | Wang |
| 2022/0066456 A1 | 3/2022 | Ebrahimi Afrouzi |
| 2022/0178842 A1* | 6/2022 | Wang ................ A47L 11/4011 |
| 2022/0198705 A1* | 6/2022 | McKenzie ............... G06T 7/74 |
| 2022/0222479 A1* | 7/2022 | Hassani ............... G06V 10/143 |
| 2022/0284226 A1* | 9/2022 | Lev ........................ G06T 7/11 |
| 2022/0369886 A1 | 11/2022 | Liao |
| 2023/0304942 A1* | 9/2023 | Wang ................ A47L 11/4002 |

FOREIGN PATENT DOCUMENTS

| | | |
|---|---|---|
| CN | 103873786 A | 6/2014 |
| CN | 104093016 A | 10/2014 |
| CN | 106575366 A | 4/2017 |
| CN | 106706644 A | 5/2017 |
| CN | 107917918 A | 4/2018 |
| CN | 108027239 A | 5/2018 |
| CN | 108320275 A | 7/2018 |
| CN | 108663371 A | 10/2018 |
| DE | 100 59 240 A1 | 2/2002 |
| DE | 10 2016 107 312 A1 | 11/2016 |
| GB | 2 243 968 A | 11/1991 |
| JP | 2013-168104 A | 8/2013 |
| KR | 10-2018-0075176 A | 7/2018 |
| TW | I531984 B | 5/2016 |

OTHER PUBLICATIONS

Futao Zhang, The Blemish Detection Research of Camera Module Based on Background Difference, "China's Excellent Master's Thesis Full-text Database (Information Technology Series)". ,Jun. 2017.

Lahiru Jayasinghe etc., Feature Learning and Analysis for Cleanliness Classification in Restrooms, IEEE Access, vol. 7, p. 14871-14882. ,Jan. 21, 2019.

* cited by examiner

MATERIAL DETERMINING DEVICE, MATERIAL DETERMINING METHOD, AUTONOMOUS CLEANING DEVICE

CROSS REFERENCE TO RELATED APPLICATIONS

This application is a continuation-in-part of U.S. application Ser. No. 16/907,329, filed on Jun. 22, 2020. The content of the application is incorporated herein by reference.

BACKGROUND OF THE INVENTION

1. Field of the Invention

The present invention relates to a material determining device, a material determining method and an autonomous cleaning device, and particularly relates to a material determining device, a material determining method and an autonomous cleaning device which can determine a type of material according to images sensed by different image sensors.

2. Description of the Prior Art

An autonomous cleaning device (e.g., a robot cleaner) becomes more and more popular recently. The autonomous cleaning device can determine a location thereof and accordingly performs a clean action. However, a conventional autonomous cleaning device does not have a function of distinguishing from liquid and a transparent object with light guide characteristics such as a glass, thus may perform improper cleaning operations.

Such operation may cause some inconvenience to the user. For example, the autonomous cleaning device is a vacuum cleaner but still try to clean the liquid. Such operation may cause the environment surrounding it to be more terrible. On the opposite, if the autonomous cleaning device has a mopping function, it may mop through the transparent object if it misdetermines the transparent object to be liquid. Such operation may make the transparent object shatter thus may cause danger to the user or damages important stuffs.

SUMMARY OF THE INVENTION

One objective of the present invention is to provide a material determining method which can determine a type of material according to images of different image sensors.

Another objective of the present invention is to provide a material determining device which can determine a type of material according to images of different image sensors.

Another objective of the present invention is to provide an autonomous cleaning device which can determine a type of material according to images of different image sensors and correspondingly operates.

One embodiment of the present invention discloses a material determining method, applied to a material determining device comprising a first image sensor, a second image sensor, and a light source. The material determining method comprises: (a) sensing a first image by the first image sensor according to light from the light source; (b) sensing a second image by the second image sensor according to the light; and (c) determining whether material corresponding to material images in the first image and the second image is first type of material or second type of material, according to locations of the material images in the first image and the second image and according to shapes of the material images in the first image and the second image.

Another embodiment of the present invention discloses a material determining device, comprising: a light source, configured to emit light; a first image sensor, configured to sense a first image generated according to the light; a second image sensor, configured to sense a second image generated according to the light; and a processing circuit, configured to determine whether material corresponding to material images in the first image and the second image is first type of material or second type of material, according to locations of the material images in the first image and the second image and according to shapes of the material images in the first image and the second image.

Still another embodiment of the present invention discloses a material determining device, comprising: a light source, configured to emit light; a first image sensor, configured to sense a first image generated according to the light; a second image sensor, configured to sense a second image generated according to the light; a processing circuit, configured to determine material corresponding to material images in the first image and the second image, according to the first image and the second image; and a circuit board, wherein the light source, the first image sensor and the second image sensor are provided in or on the circuit board.

Still another embodiment of the present invention discloses an autonomous cleaning device, comprising: a light source, configured to emit light; a first image sensor, configured to sense a first image generated according to the light; a second image sensor, configured to sense a second image generated according to the light; and a processing circuit, configured to determine whether material corresponding to material images in the first image and the second image is first type of material or second type of material, according to locations of the material images in the first image and the second image and according to shapes of the material images in the first image and the second image; wherein the processing circuit controls the autonomous cleaning device to move, stop, avoid the material or generate an informing message according to whether the material is the first type of material or the second type of material.

In view of above-mentioned embodiments, the type of material can be determined by images of different image sensors, thus the autonomous cleaning device can properly controlled corresponding to the type of material.

These and other objectives of the present invention will no doubt become obvious to those of ordinary skill in the art after reading the following detailed description of the preferred embodiment that is illustrated in the various figures and drawings.

DETAILED DESCRIPTION

In the following descriptions, several embodiments are provided to explain the concept of the present application. It will be appreciated that the system, the device, the apparatus or the module depicted in following embodiments can be implemented by hardware (ex. circuit) or the combination of hardware and software (ex. a processing unit executing at least one program). The term "first", "second", "third" in following descriptions are only for the purpose of distinguishing different one elements, and do not mean the sequence of the elements. For example, a first device and a second device only mean these devices can have the same structure but are different devices.

Further, in following embodiments, an autonomous clean device is taken as an example for explaining the material determining mechanism provided by the present invention. However, the material determining method can be applied to any other kind of electronic device. In such case, the electronic device can be regarded as a material determining device. Additionally, in following embodiments, the material determining mechanism is applied for determining solid non-light guide material, non-solid light guide material and solid light guide material. However, the material determining mechanism can also be applied for determining other different types of materials.

The solid non-light guide material can be a normal object such as a small wood chip, a pen or a key which can reflect light but has no light guide characteristics. Also, the non-solid light guide material can be liquid or colloid which has light guide characteristics, such as water or glue. Additionally, the solid light guide material can be solid material which has light guide characteristics, such as a transparent glass or a plastic bottle.

Figure 1:
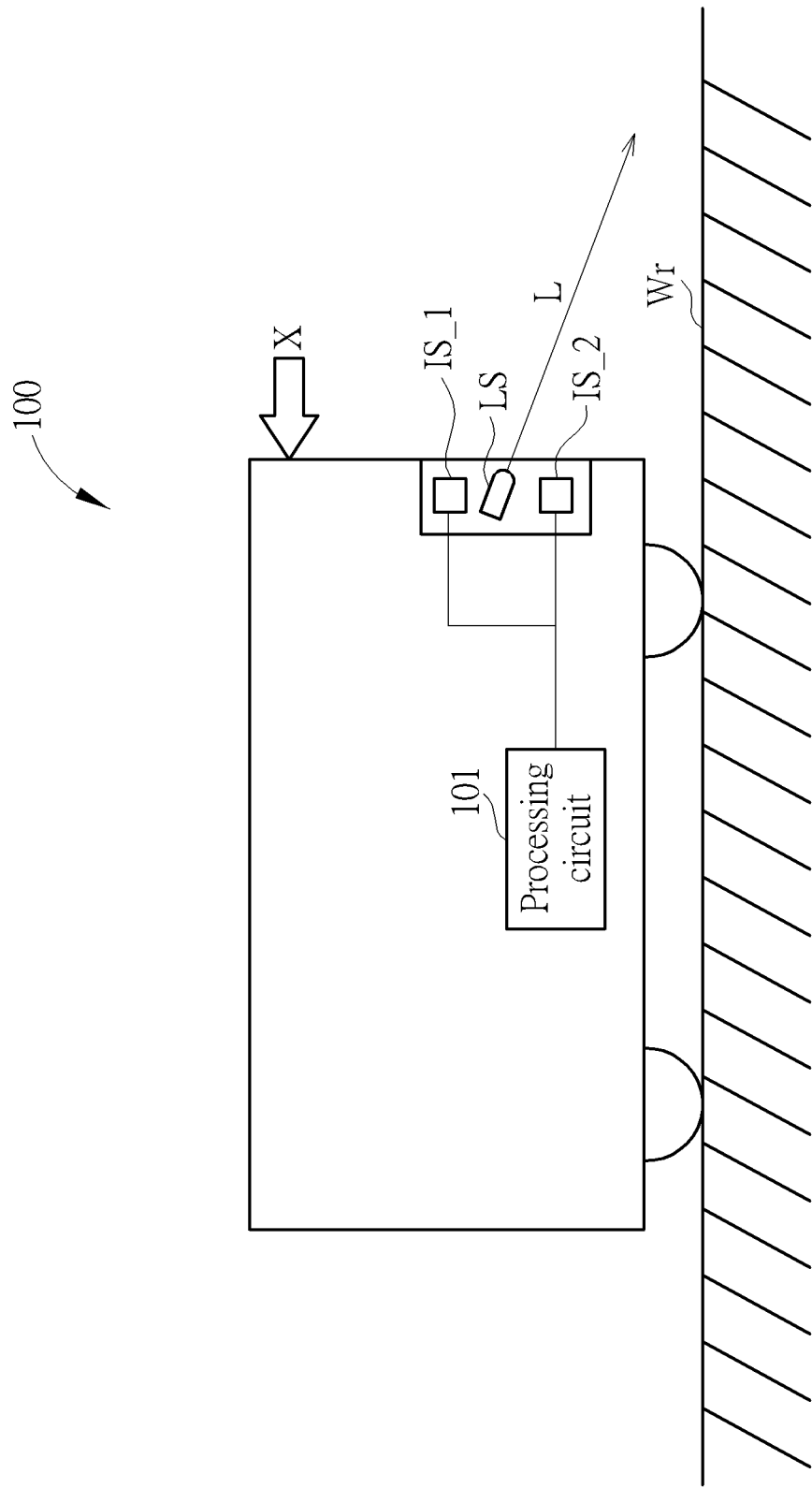
FIG. 1 is a block diagram illustrating an autonomous cleaning device according to one embodiment of the present invention.

FIG. 1 is a block diagram illustrating an autonomous cleaning device 100 according to one embodiment of the present invention. As illustrated in FIG. 1, the autonomous cleaning device 100 comprises a light source LS, a first image sensor IS_1, a second image sensor IS_2 and a processing circuit 101. The light source LS is configured to emit light L. In following embodiments, the light source LS is a line light source. The first image sensor Img_1 is configured to sense a first image generated according to the light L. The second image sensor IS_2 is configured to sense a second image generated according to the light L. In one embodiment, the first image and the second image are sensed at the same time. The processing circuit 101 is configured to determine whether material corresponding to material images in the first image and the second image is first type of material or second type of material, according to locations of the material images in the first image and the second image and according to shapes of the material images in the first image and the second image. Details of determining types of the material will be described below.

In one embodiment, the first type of material is solid non-light guide material or the non-solid light guide material. In such embodiment, the second type of material is solid light guide material. As above-mentioned, in following embodiments, a small wood chip is taken as an example for solid non-light guide material, water is taken as an example for non-solid light guide material and a transparent glass is taken as an example for solid light guide material.

In one embodiment, the step of determining the material determines the material is the first type of material (water or small wood chip) if the material images in the first image and the second image have different locations and have identical shapes, and determines the material is the second type of material (transparent glass) if the material images in the first image and the second image have different locations and have different shapes.

Figure 2:
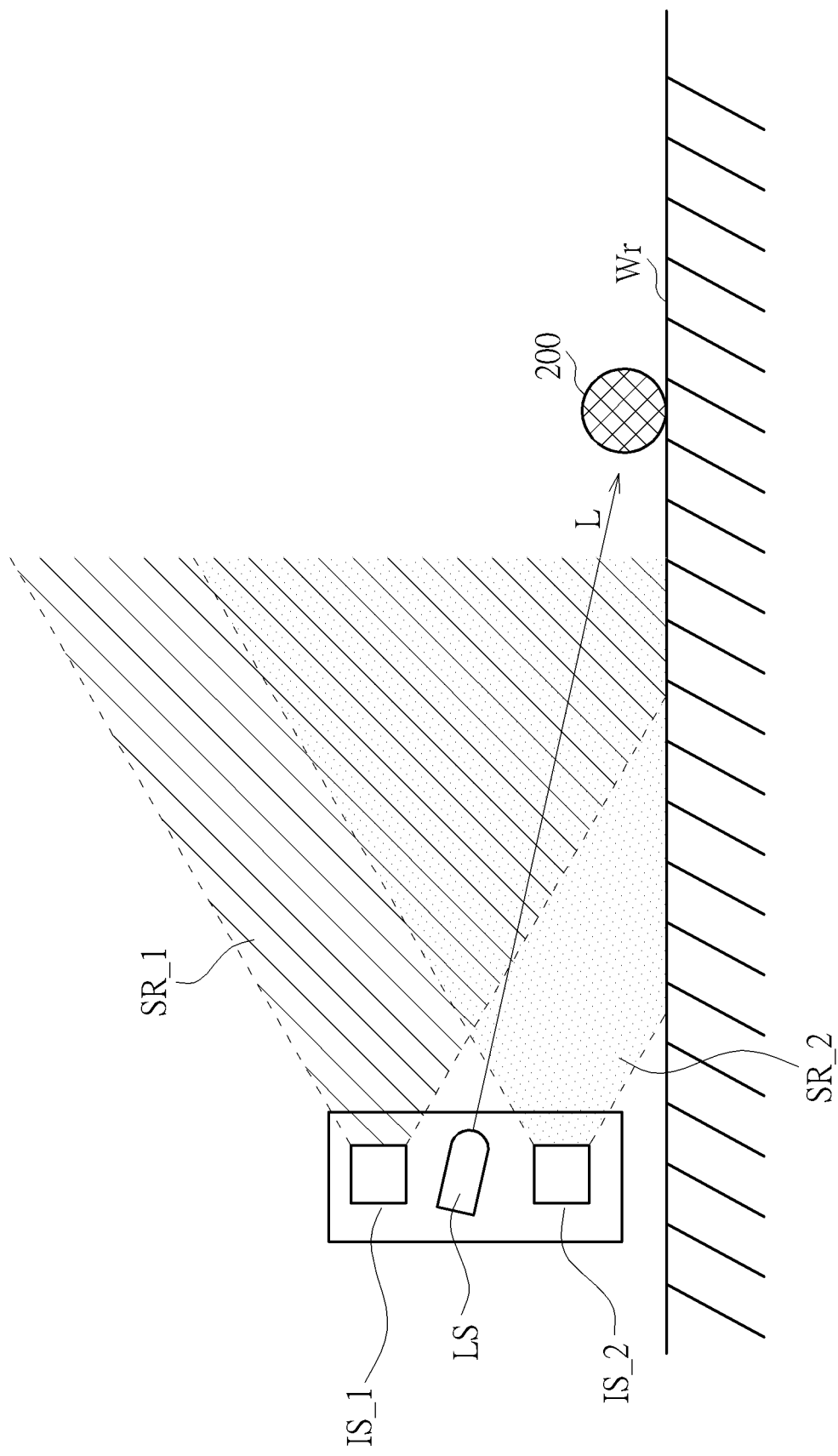
FIG. 2, FIG. 3 and FIG. 4 are schematic diagram illustrating the operations of determining a small wood chip and water.
Figure 3:
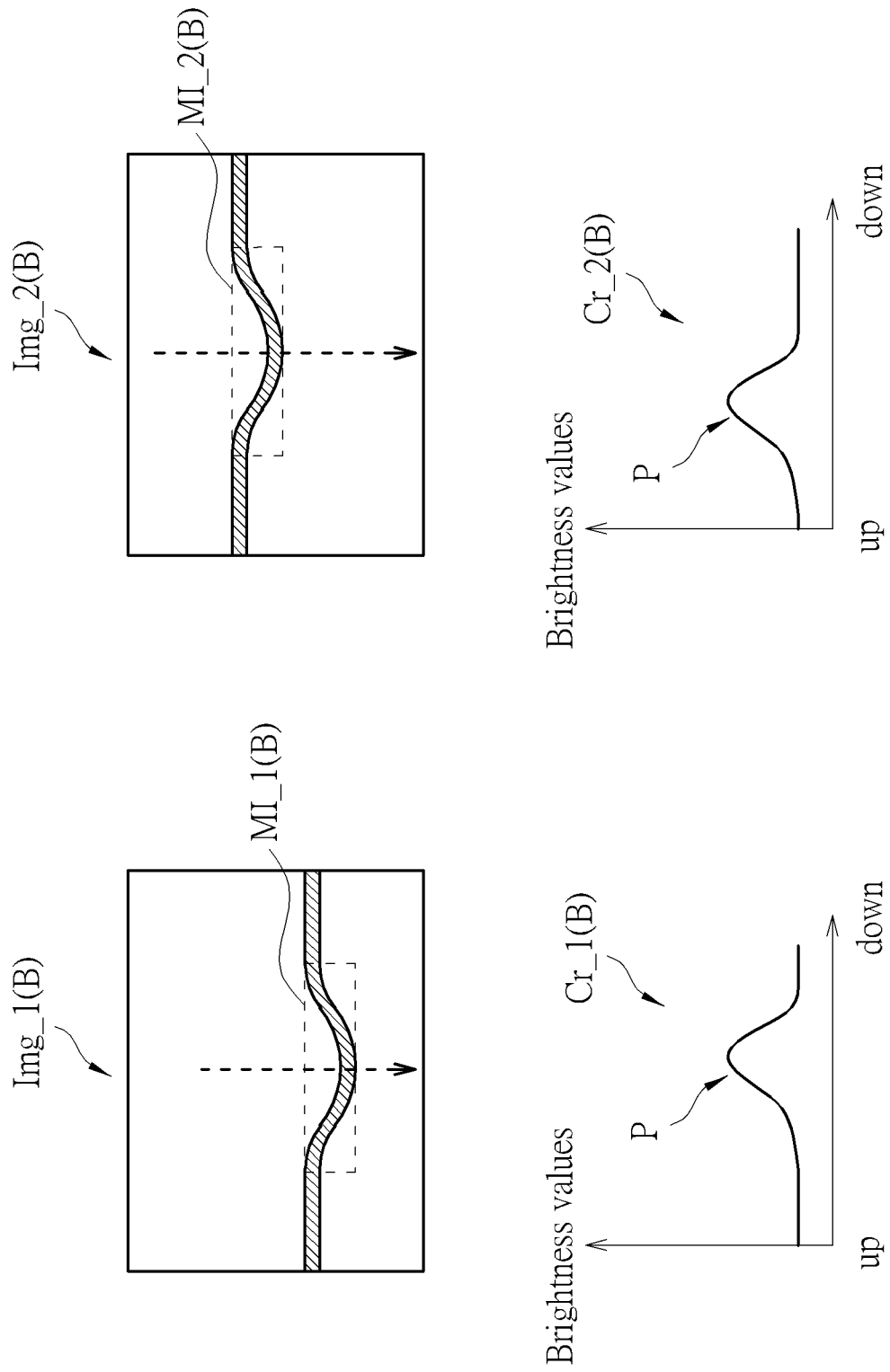
Figure 4:
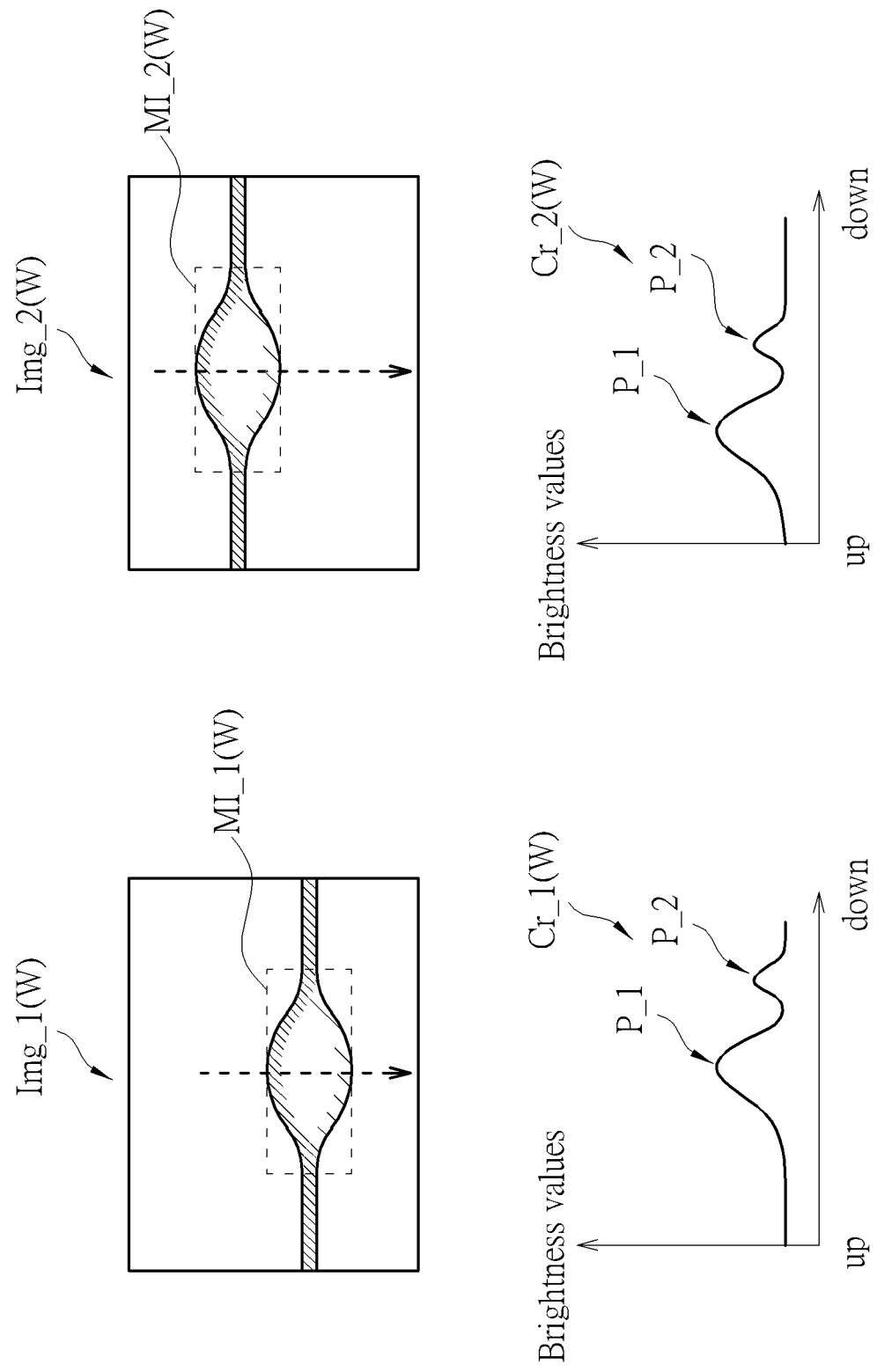

Details of determining types of the material will be described in following embodiments. Please note, for the convenience of explaining, the autonomous cleaning device 100 and the processing circuit 101 in FIG. 1 are not illustrated in following embodiments. FIG. 2, FIG. 3 and FIG. 4 are schematic diagram illustrating the operations of determining a small wood chip and water. In FIG. 2, if the target material 200 is a small wood chip, it reflects light L and has not light guide characteristics, and the first image sensor IS_1, the second image sensor IS_2 respectively have different sensing regions SR_1, SR_2. Therefore, the first image sensor IS_1 senses a first image Img_1(B) and the second image sensor IS_2 senses a second image Img_2(B) as illustrated in FIG. 3.

The regions with slashes in the first image Img_1(B) and the second image Img_2(B) mean bright regions in images. As above-mentioned, the light source LS is a line light source. Therefore, the light L forms a bended bright region in the first image Img_1(B) and the second image Img_2(B) when the light L is emitted to target material 200 which is a small wood chip. Such bended bright region can be regarded as the material image, such as the material images MI_1(B) and MI_2(B) in FIG. 3.

Many methods can be used to determine which parts of the first image Img_1(B) and the second image Img_2(B) are the material images. For example, the bright region which is only caused by the light L but not caused by any other material can be pre-recorded, thus the material images MI_1(B) and MI_2(B) can be computed according to the bright regions in the first image Img_1(B) and the second image Img_2(B) and the pre-recorded bright regions. In another embodiment, the processing circuit 101 can determine the bright regions which are not straight but bended as the material images, since the light source LS is a line light source. Also, in one embodiment, the material image means the whole bright region in the image.

After the material images are acquired, the processing circuit 101 determines the type of material according to locations of the material images and according to shapes of the material images. As above-mentioned, the small wood chip reflects the light L but has no light guiding characteristics. Therefore, the material images MI_1(B) and MI_2(B) in the first image Img_1(B) and the second image Img_2(B) have identical shapes but different locations. In other words, the material images in the first image Img_1(B) and the second image Img_2(B) have identical shapes but are shifted up and down.

The curves Cr_1(B) and Cr_2(B) represent the brightness values of the first image Img_1(B) and the second image Img_2(B) from top to bottom on the vertical axis, for example along the arrows illustrated in the first image Img_1(B) and the second image Img_2(B). As shown in FIG. 3, the curve Cr_1(B) is initially low then becomes high and then becomes low again. The peak P of the curve Cr_1(B) corresponds to the bright region in the material image MI_1(B). Compared with the curve Cr_1(B), the curve Cr_2(B) has the same curve but is shifted to the left.

In the embodiment of FIG. 4, the target material 200 in FIG. 2 is water. Compared with the small wood chip, water has a lower reflectivity but has light guide characteristics, thus reflects less light and the light can be guided by the water. Accordingly, the material images MI_1(W) and MI_2(W) in FIG. 4 are different from the material images MI_1(B) and MI_2(B) in FIG. 3. In FIG. 4, the material images MI_1(W) and MI_2(W) have wider areas and have bright variations. The region with denser slashes means a region with higher brightness values. On the opposite, the region with thin slashes means a region with lower brightness values. Thus, the material images MI_1(W) and MI_2 (W) in FIG. 4 respectively has a bright region with a higher brightness value (with dense slashes), a dark region (with no slashes) and a bright region with a lower brightness value (with thin slashes). However, the material images MI_1(W) and MI_2(W) still have identical shapes but are shifted up and down.

As above-mentioned, the curves Cr_1(W) and Cr_2(W) represent the brightness values of the first image Img_1(W) and the second image Img_2(W) from top to bottom on the vertical axis, for example along the arrows illustrated in the first image Img_1(W) and the second image Img_2(W). As shown in FIG. 4, the curve Cr_1(W) is initially low then becomes high, then becomes low, then becomes high again and then becomes low again. The first peak P_1 in the curve Cr_1(W) corresponds to a bright region, which has a higher brightness value, of the material image MI_1(W), and the second peak P_2 in the curve Cr_1(W) corresponds to a bright region, which has a lower brightness value, of the material image MI_1(W). Compared with the curve Cr_1 (W), the curve Cr_2(W) has the same curve but is shifted to the left.

Figure 5:
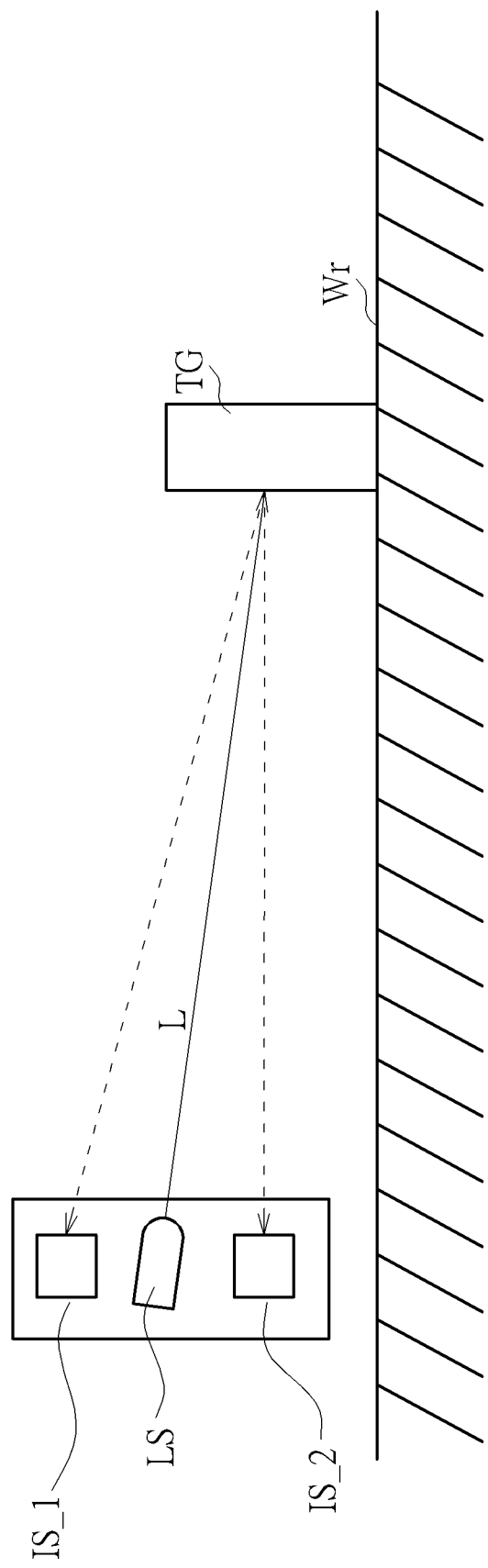
FIG. 5, FIG. 6 and FIG. 7 are schematic diagram illustrating the operations of determining a transparent glass.
Figure 6:
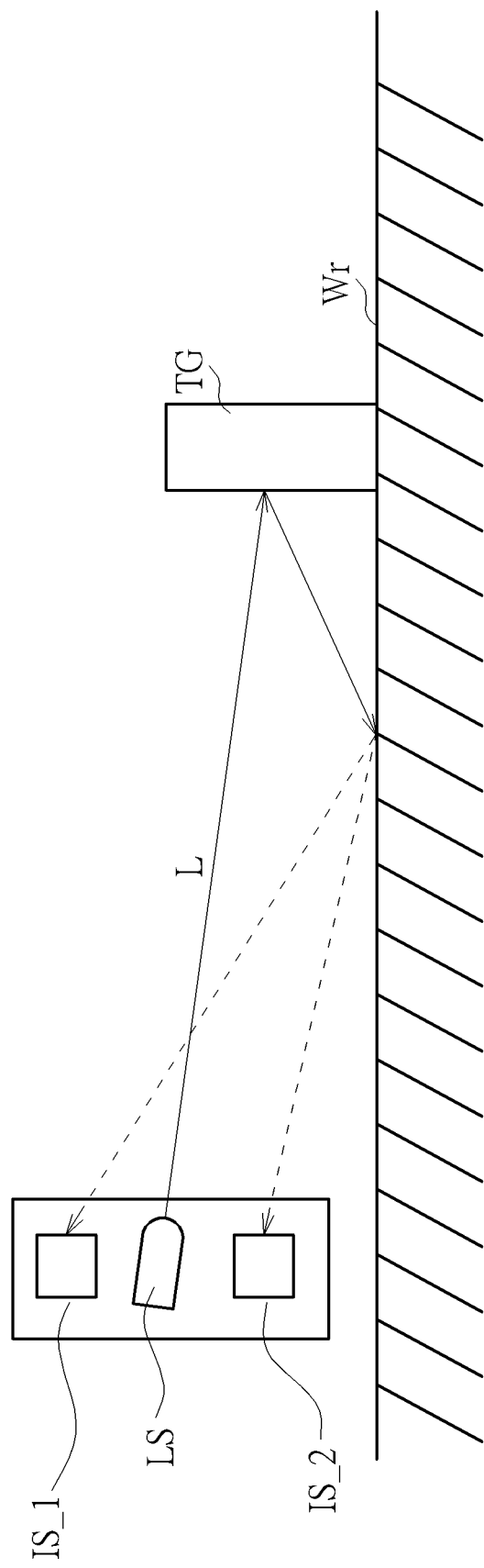
Figure 7:
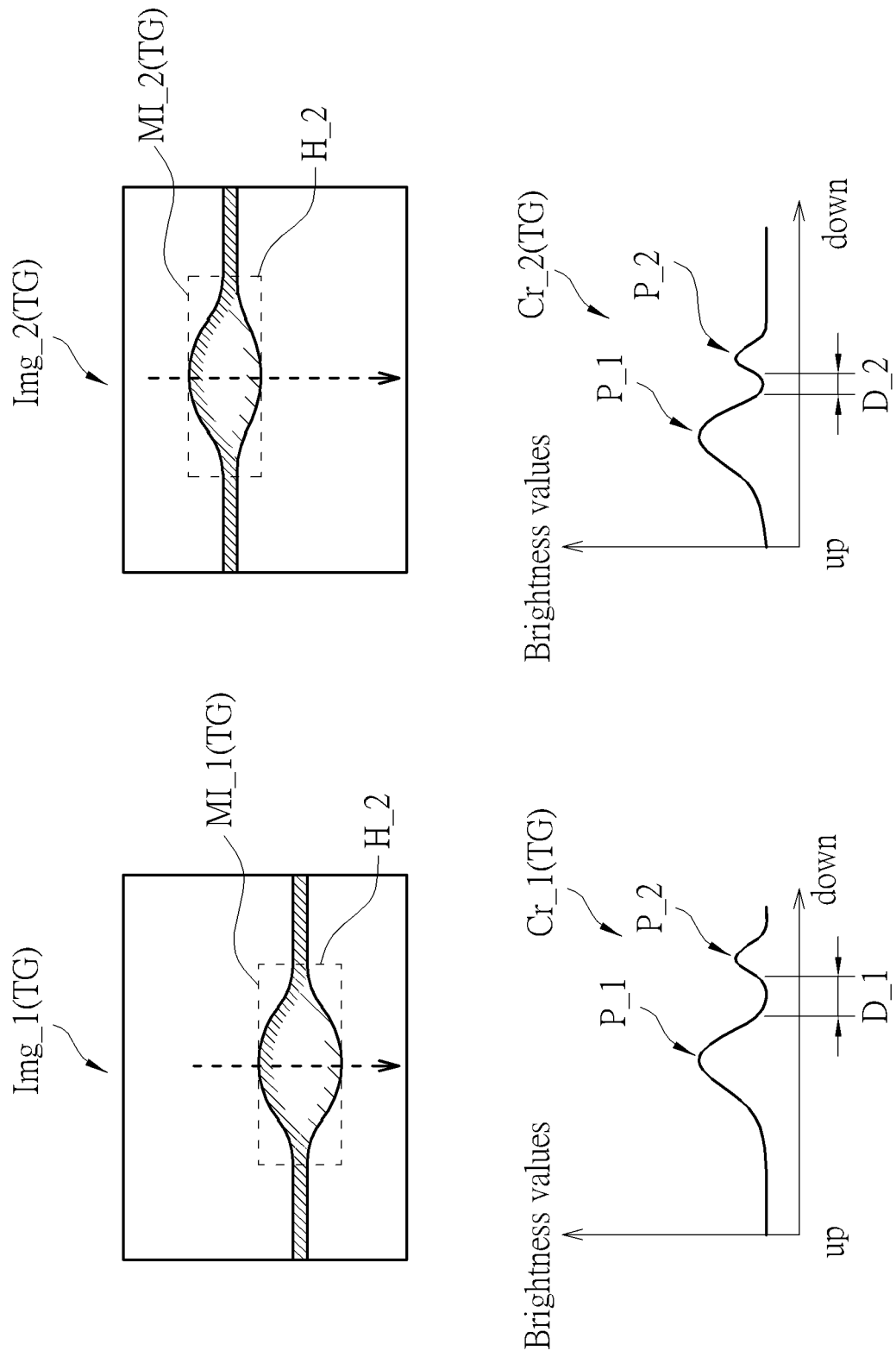

FIG. 5, FIG. 6 and FIG. 7 are schematic diagram illustrating the operations of determining a transparent glass TG. Please note, the operations in FIG. 5 and FIG. 6 may simultaneously occur but are illustrated in different figures for better explaining. FIG. 5 illustrates that the light L is reflected by the transparent glass TG and then received by the first image sensor IS_1, the second image sensor IS_2. Also, the transparent glass TG has a higher reflectivity and has light guide characteristics. Accordingly, the light reflected by the transparent glass TG may be reflected by the working surface Wr (e.g., a ground) again and then received by the first image sensor IS_1, the second image sensor IS_2, as shown in FIG. 6.

Due to the operations illustrated in FIG. 5 and FIG. 6, the material images MI_1 (TG) and MI_2 (TG) in the first image Img_1 (TG) and the second image Img_2 (TG) have different shapes and different locations. In other words, the material images MI_1 (TG) and MI_2 (TG) have different shapes and are shifted up and down. For more detail, the material images MI_1(TG) and MI_2(TG) in FIG. 7 are similar with the material images MI_1(W) and MI_2(W) in FIG. 4, since the transparent TG also have light guide characteristics. However, the height of the material image MI_1(TG) is larger than the material image MI_2(TG) due to the operations illustrated in FIG. 5 and FIG. 6. In other words, the height H 1 is larger than the height H 2.

Further, in FIG. 7, the material images MI_1(TG) and MI_2(TG) have bright variations. The region with denser slashes means a region with higher brightness values. On the opposite, the region with thin slashes means a region with lower brightness values. Thus, the material images MI_1 (TG) and MI_2(TG) in FIG. 7 respectively has a bright region with a higher brightness value, a dark region and a bright region with a lower brightness value. Additionally, the material images MI_1 (TG) and MI_2 (TG) have different shapes and are shifted up and down.

The curves Cr_1(TG) and Cr_2(TG) represent the brightness values of the first image Img_1(TG) and the second image Img_2(TG) from top to bottom on the vertical axis, for example along the arrows illustrated in the first image Img_1(TG) and the second image Img_2(TG). As shown in FIG. 7, the curve Cr_1(TG) is initially low then becomes high, then becomes low, then becomes high again and then becomes low again. The first peak P_1 in the curve Cr_1 (TG) corresponds to a bright region, which has a higher brightness value, of the material image MI_1(TG), and the second peak P_2 in the curve Cr_1 (TG) corresponds to a bright region, which has a lower brightness value, of the material image MI_1(TG). Compared with the curve Cr_1 (TG), the curve Cr_2(TG) has a similar curve but is shifted to the left and has a narrowed distance between the first peak P_1 and the second peak P_2. In other words, the distance D_1 is larger than the distance D_2.

Based on above-mentioned embodiments, the processing circuit 101 can determine whether the material is the first type or the second type according to the locations and shapes of the material images. Specifically, the processing circuit 101 determines the material is the solid non-light guide material (e.g., a small wood chip) or non-solid light guide material (water) if the material images in the first image and the second image have different locations and have identical shapes, and determines the material is the solid light guide material (e.g., transparent glass) if the material images in the first image and the second image have different locations and have different shapes.

After determines the type of material, the processing circuit 101 can control the autonomous cleaning device 100 to move, stop, avoid the material or generate an informing message according to the type of material. For example, if the processing circuit 101 determines the small wood chip or the water exist and the autonomous cleaning device 100 has the function of clean water and a small object, the autonomous cleaning device 100 can keep moving on and try to clean the mall wood chip or the water. For another example, if the processing circuit 101 determines the transparent glass exists, it may stop and generates an informing message or avoid the transparent glass, since the transparent glass is a fragile item.

In view of above-mentioned embodiments, a material determining method can be acquired. The material determining method is applied to a material determining device comprising a first image sensor, a second image sensor, and a light source. The material determining method comprises: (a) sensing a first image by the first image sensor (e.g., first image sensor IS_1) according to light from the light source; (b) sensing a second image by the second image sensor (e.g., second image sensor IS_2) generated according to the light; and (c) determining whether material corresponding to material images in the first image and the second image is first type of material or second type of material, according to locations of the material images in the first image and the second image and according to shapes of the material images in the first image and the second image (e.g., the embodiments illustrated in FIG. 3, FIG. 4 and FIG. 7).

Figure 8:
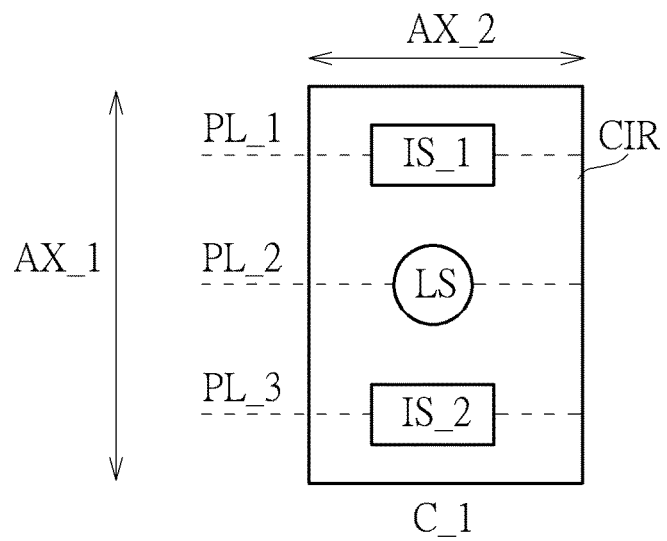
FIG. 8, FIG. 9 and FIG. 10 are different configurations of the first image sensor, the second image sensor, and the light source, according to different embodiments of the present invention.
Figure 8:
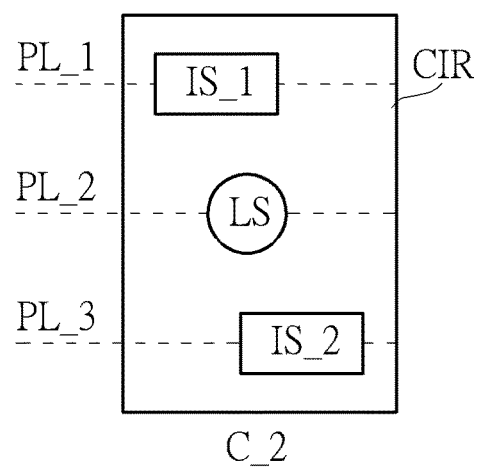
Figure 8:
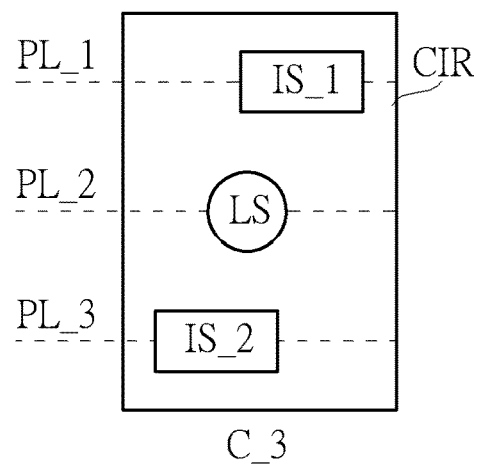
Figure 9:
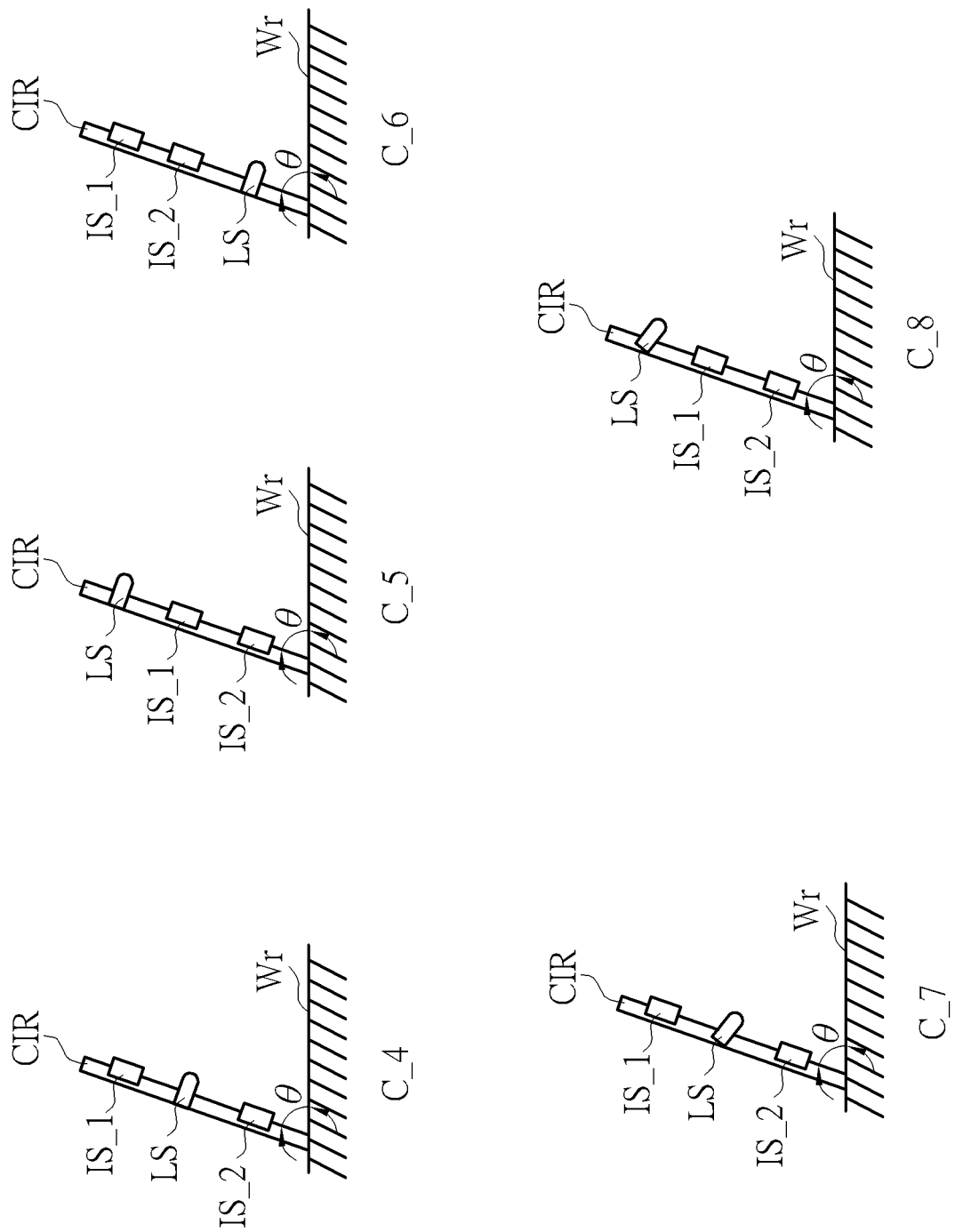
Figure 10:
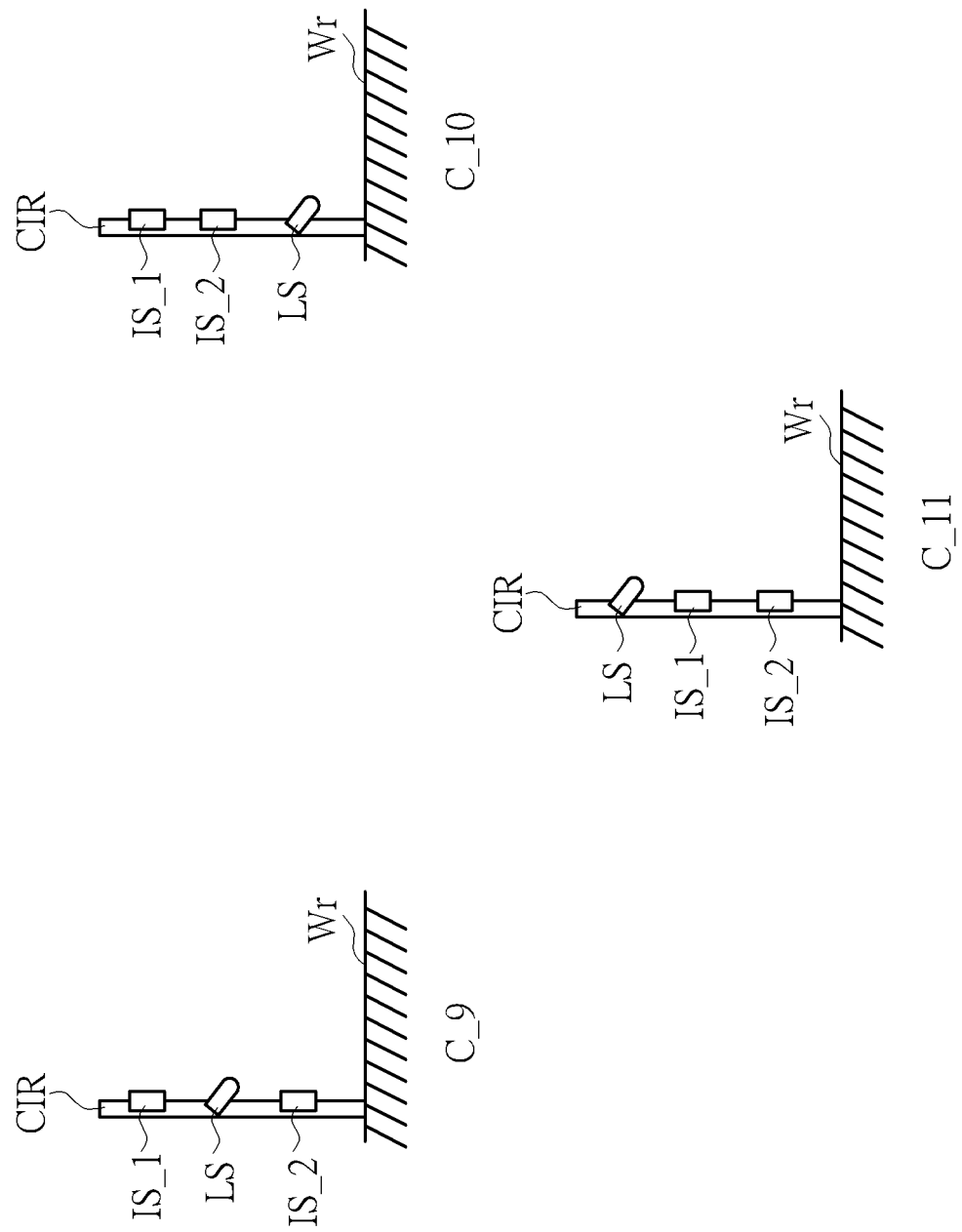

The first image sensor IS_1, the second image sensor IS_2 and the light source LS may have various configurations. FIG. 8, FIG. 9 and FIG. 10 are different configurations of the first image sensor IS_1, the second image sensor IS_2, and the light source LS, according to different embodiments of the present invention. In the embodiments of FIG. 8, FIG. 9 and FIG. 10, the first image sensor IS_1, the second image sensor IS_2 and the light source LS are provided in or on a circuit board CIR. In other words, the image sensors and the light source LS may be mounted in or on the circuit board CIR at different specific angles. For example, the light source LS may be mounted in or on the circuit board CIR perpendicular to the circuit board CIR, and the image sensors may be mounted in or on the circuit board CIR at different angles which having tilted angles along a working ground.

FIG. 8 is a schematic diagram which is viewed following the X direction illustrated in FIG. 1. In the embodiment of FIG. 8, the light source LS, the first image sensor IS_1 and the second image sensor IS_2 are distributed along a first direction of the circuit board in different horizontal planes PL_1, PL_2, PL_3. The horizontal planes are parallel with a working surface Wr on which the autonomous cleaning device 100 is located on. If a bottom surface of the autonomous cleaning device is parallel with the working surface Wr, the horizontal planes are parallel with the bottom surface. The following embodiments which are related with the working surface Wr can also follow such rule.

Namely, the circuit board CIR has a first axis AX_1 and a second axis AX_2. The first axis AX_1 is perpendicular with the working surface Wr and the second axis AX_2 is parallel with the working surface Wr. The coordinates of the light source LS, the first image sensor IS_1 and the second image sensor IS_2 on the first axis AX_1 are different. Also, the coordinates of the light source LS, the first image sensor IS_1 and the second image sensor IS_2 on the second axis AX_2 can be the same or different. For example, in configuration C_1 of FIG. 8, the coordinates of the light source LS, the first image sensor IS_1 and the second image sensor IS_2 on the first axis AX_1 are different but the coordinates thereof on the second axis AX_2 are identical. Besides, in configurations C_2, C_3 of FIG. 8, the coordinates of the light source LS, the first image sensor IS_1 and the second image sensor IS_2 on the first axis AX_1 are different and the coordinates thereof on the second axis AX_2 are different as well.

In the embodiments of FIG. 1 and FIG. 8, the light source LS is located between the first image sensor Img_1 and the second image sensor Img_2. In another embodiment, the light source LS is below the first image sensor Img_1 and the second image sensor Img_2, while the first image sensor Img_1, the second image sensor Img_2 and the light source LS are above the working surface Wr, as shown in the configuration C_6 in FIG. 9 and the configuration C_10 in FIG. 10. In still another embodiment, the light source LS is above the first image sensor Img_1 and the second image sensor Img_2, while the first image sensor Img_1, the second image sensor Img_2 and the light source LS are above the working surface Wr, as shown in the configurations C_5, C_8 in FIG. 9 and the configuration C_11 in FIG. 10.

In one embodiment, the circuit board CIR is not perpendicular with the working surface Wr, as shown in the configuration C_4, C_5, C_6, C_7 and C_8 in FIG. 9. That is, the circuit board CIR is tilted such that a smallest tilt angle θ exists between the circuit board CIR and the working surface Wr is smaller than 90°. Additionally, in another embodiment, the circuit board CIR is perpendicular with the working surface Wr, as shown in the configuration C_9, C_10 and C_11 in FIG. 10. Please note, the description "the circuit board CIR is not perpendicular with the working surface Wr" here can mean the circuit board CIR itself or an extension line thereof is not perpendicular with the working surface Wr. Similarly, the description "the circuit board CIR is perpendicular with the working surface Wr" here can mean the circuit board CIR itself or an extension line thereof is perpendicular with the working surface Wr.

Further, in the embodiment of FIG. 1 and the configurations C_7, C_8 and configurations C_9, C_10 and C_11 in FIG. 10, a light emitting direction of the light source LS is not perpendicular with the circuit board CIR. Namely, the light source LS is tilted. In another embodiment, such as the configurations C_4, C_5, and C_6 in FIG. 9, a light emitting direction of the light source LS is perpendicular with the circuit board CIR. That is, the light source LS is not tilted.

The tilt angles of the circuit boards CIR and the light source LS can be set corresponding to different requirements, for example, corresponding to assembly requirements, image sensor sensitivities, or light intensities. Additionally, the light wavelength of the light source LS can also be set corresponding to different requirements, for example, corresponding to the tilt angles of the circuit board CIR or the light source LS, according to the configurations of the autonomous cleaning device, according to the image sensor sensitivities, or according to the light intensities. In one embodiment, the light wavelength is smaller than 940 nm.

In view of above-mentioned embodiments, the type of material can be determined by images of different image sensors, thus the autonomous cleaning device can properly controlled corresponding to the type of material.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A material determining method, applied to a material determining device comprising a first image sensor, a second image sensor, and a light source, the material determining method comprising:
   (a) sensing a first image by the first image sensor according to light from the light source;
   (b) sensing a second image by the second image sensor according to the light; and
   (c) determining whether material corresponding to material images in the first image and the second image is first type of material or second type of material, according to locations of the material images in the first image and the second image and according to shapes of the material images in the first image and the second image.

2. The material determining method of claim 1, wherein the first type of material is solid non-light guide material and the second type of material is solid light guide material.

3. The material determining method of claim 1, wherein the first type of material is non-solid light guide material and the second type of material is solid light guide material.

4. The material determining method of claim 1, wherein the step (c) determines the material is the first type of material if the material images in the first image and the second image have different ones of the locations and have identical ones of the shapes s, and determines the material is the second type of material if the material images in the first image and the second image have different ones of the locations and have different ones of the shapes.

5. The material determining method of claim 1, wherein material determining device is an autonomous cleaning device.

6. A material determining device, comprising:
   a light source, configured to emit light;
   a first image sensor, configured to sense a first image generated according to the light;
   a second image sensor, configured to sense a second image generated according to the light; and
   a processing circuit, configured to determine whether material corresponding to material images in the first image and the second image is first type of material or second type of material, according to locations of the material images in the first image and the second image and according to shapes of the material images in the first image and the second image.

7. The material determining device of claim 6, wherein the first type of material is solid non-light guide material and the second type of material is solid light guide material.

8. The material determining device of claim 6, wherein the first type of material is non-solid light guide material and the second type of material is solid light guide material.

9. The material determining device of claim 6, wherein the step of determining the material determines the material is the first type of material if the material images in the first image and the second image have different ones of the locations and have identical ones of the shapes, and determines the material is the second type of material if the material images in the first image and the second image have different ones of the locations and have different ones of the shapes.

10. The material determining device of claim 6, wherein material determining device is an autonomous cleaning device.

11. A material determining device, comprising:
a light source, configured to emit light;
a first image sensor, configured to sense a first image generated according to the light;
a second image sensor, configured to sense a second image generated according to the light;
a processing circuit, configured to determine a type of material corresponding to material images in the first image and the second image, according to the first image and the second image; and
a circuit board, wherein the light source, the first image sensor and the second image sensor are provided in or on the circuit board.

12. The material determining device of claim 11, wherein the light source, the first image sensor and the second image sensor are distributed along a first direction of the circuit board in different horizontal planes, wherein the horizontal planes are parallel with a working surface on which the material determining device is located on.

13. The material determining device of claim 12, wherein the light source is located between the first image sensor and the second image sensor.

14. The material determining device of claim 12, wherein the first image sensor, the second image sensor and the light source are above the working surface, wherein the light source is below the first image sensor and the second image sensor.

15. The material determining device of claim 12, wherein the first image sensor, the second image sensor and the light source are above the working surface, wherein the light source is above the first image sensor and the second image sensor.

16. The material determining device of claim 11, wherein the circuit board is not perpendicular with a working surface which the material determining device is located on.

17. The material determining device of claim 11, wherein the circuit board is perpendicular with a working surface which the material determining device is located on.

18. The material determining device of claim 11, wherein a light emitting direction of the light source is not perpendicular with the circuit board.

19. The material determining device of claim 11, wherein a light emitting direction of the light source is perpendicular with the circuit board.

20. The material determining device of claim 11, wherein material determining device is an autonomous cleaning device.

21. An autonomous cleaning device, comprising:
a light source, configured to emit light;
a first image sensor, configured to sense a first image generated according to the light;
a second image sensor, configured to sense a second image generated according to the light; and
a processing circuit, configured to determine whether material corresponding to material images in the first image and the second image is first type of material or second type of material, according to locations of the material images in the first image and the second image and according to shapes of the material images in the first image and the second image;
wherein the processing circuit controls the autonomous cleaning device to move, stop, avoid the material or generate an informing message according to whether the material is the first type of material or the second type of material.

22. The autonomous cleaning device of claim 21, wherein the first type of material is solid non-light guide material and the second type of material is solid light guide material.

23. The autonomous cleaning device of claim 21, wherein the first type of material is non-solid light guide material and the second type of material is solid light guide material.

24. The autonomous cleaning device of claim 21, wherein the step of determining the material determines the material is the first type of material if the material images in the first image and the second image have different ones of the locations and have identical ones of the shapes, and determines the material is the second type of material if the material images in the first image and the second image have different ones of the locations and have different ones of the shapes.

* * * * *